(12) United States Patent
Wexler et al.

(10) Patent No.: US 8,886,650 B2
(45) Date of Patent: Nov. 11, 2014

(54) ALGORITHMICALLY CHOOSING WHEN TO USE BRANDED CONTENT VERSUS AGGREGATED CONTENT

(75) Inventors: Mike Wexler, Santa Clara, CA (US); Deepa Joshi, Sunnyvale, CA (US)

(73) Assignee: Yahoo! Inc., Sunnyvale, CA (US)

( * ) Notice: Subject to any disclaimer, the term of this patent is extended or adjusted under 35 U.S.C. 154(b) by 456 days.

(21) Appl. No.: 12/626,584

(22) Filed: Nov. 25, 2009

(65) Prior Publication Data

US 2011/0125739 A1 May 26, 2011

(51) Int. Cl.
G06F 7/00 (2006.01)
G06F 17/30 (2006.01)

(52) U.S. Cl.
CPC .... G06F 17/30905 (2013.01); G06F 17/30867 (2013.01)
USPC .......................................... 707/738; 707/748

(58) Field of Classification Search
CPC ....................................................... G06F 17/30
See application file for complete search history.

(56) References Cited

U.S. PATENT DOCUMENTS

| | | | |
|---|---|---|---|
| 7,593,928 B2 * | 9/2009 | Canon et al. ........................... 1/1 |
| 2002/0087580 A1 * | 7/2002 | LaCroix et al. ............. 707/104.1 |
| 2003/0110007 A1 * | 6/2003 | McGee et al. ................. 702/179 |
| 2003/0212610 A1 * | 11/2003 | Duffy et al. ..................... 705/26 |
| 2004/0003132 A1 * | 1/2004 | Stanley et al. ................. 709/316 |
| 2005/0071822 A1 * | 3/2005 | DeWitt et al. ................. 717/131 |
| 2005/0114198 A1 * | 5/2005 | Koningstein et al. ........... 705/10 |
| 2005/0216831 A1 * | 9/2005 | Guzik et al. ................... 715/513 |
| 2005/0278443 A1 * | 12/2005 | Winner et al. ................. 709/224 |
| 2006/0031182 A1 * | 2/2006 | Ryan et al. ....................... 706/50 |
| 2006/0200445 A1 * | 9/2006 | Chen et al. ......................... 707/2 |

(Continued)

FOREIGN PATENT DOCUMENTS

| | | |
|---|---|---|
| EP | 1930816 A1 | 6/2008 |
| WO | WO 0227625 A1 * | 4/2002 |
| WO | WO 03077168 A1 * | 9/2003 |
| WO | WO 2005093619 A1 * | 10/2005 |

OTHER PUBLICATIONS

Learn from Web Search Logs to Organize Search Results, Wang et al, Proceedings of SIGIR, pp. 87-94, Jul. 23-27, 2007.*

(Continued)

*Primary Examiner* — Augustine K Obisesan
(74) *Attorney, Agent, or Firm* — Martine Penilla Group, LLP

(57) ABSTRACT

A method and apparatus for optimizing content on a topic page includes receiving a query for a topic at a topic page on a client and transmitting the query from the topic page on the client to a web application on a server. The web application includes algorithm to analyze the query to identify a plurality of content modules that match the query. The content modules are identified from anyone of a branded source or an un-branded source. One or more module performance indicators are computed for each of the identified content modules. An aggregate module performance indicator for each of the plurality of content modules is generated from the one or more computed module performance indicators. One or more content modules from the identified plurality of content modules are automatically selected for rendering on the topic page based on the aggregate module performance indicator associated with each of the identified content modules. The resulting topic page includes content modules from just the branded source, just the un-branded source or an aggregate of content modules from both branded source and un-branded source providing optimal content that is most relevant to the query.

14 Claims, 6 Drawing Sheets

(56) References Cited

U.S. PATENT DOCUMENTS

| | | | |
|---|---|---|---|
| 2006/0235778 A1* | 10/2006 | Razvi et al. | 705/35 |
| 2007/0136251 A1* | 6/2007 | Colledge et al. | 707/3 |
| 2007/0239515 A1* | 10/2007 | Hernandez et al. | 705/10 |
| 2007/0250486 A1* | 10/2007 | Liao et al. | 707/3 |
| 2007/0276807 A1* | 11/2007 | Chen et al. | 707/3 |
| 2007/0288421 A1 | 12/2007 | Chakrabarti et al. | |
| 2007/0294615 A1* | 12/2007 | Sathe | 715/517 |
| 2008/0016043 A1* | 1/2008 | Bakalash et al. | 707/3 |
| 2008/0027789 A1* | 1/2008 | Busch et al. | 705/11 |
| 2008/0133501 A1 | 6/2008 | Andersen et al. | |
| 2008/0243613 A1* | 10/2008 | Silvestri et al. | 705/14 |
| 2009/0006334 A1 | 1/2009 | MacLaurin et al. | |
| 2009/0083251 A1* | 3/2009 | Sahasrabudhe et al. | 707/5 |
| 2009/0282013 A1* | 11/2009 | Joshi et al. | 707/5 |
| 2009/0307054 A1* | 12/2009 | D'Imporzano et al. | 705/10 |
| 2010/0094878 A1* | 4/2010 | Soroca et al. | 707/748 |

OTHER PUBLICATIONS

International Search Report—PCT/US2010/056278—dated Jun. 27, 2011 (3 pages).

\* cited by examiner

ALGORITHMICALLY CHOOSING WHEN TO USE BRANDED CONTENT VERSUS AGGREGATED CONTENT

CROSS REFERENCE TO RELATED APPLICATION

This application is related to U.S. patent application Ser. No. 12/116,195, entitled "Algorithmically generated Topic Pages," filed on May 6, 2008, U.S. patent application Ser. No. 12/116,198, entitled "Micro-Bucket Testing for Page Optimization," filed on May 6, 2008, and to U.S. patent application Ser. No. 12/242,777, filed on Sep. 30, 2008, entitled "Guiding User Moderation by Confidence Levels," assigned to the assignee, which is incorporated herein by reference in its entirety for all purposes.

BACKGROUND

1. Field of the Invention

The present invention relates to Internet searching, and more particularly, to generating topic pages through an algorithm that assembles information from branded source and aggregated source by analyzing a query.

2. Description of the Related Art

With the proliferation of information available on the Internet, the Internet has become an effective search tool. A web application receives a query with one or more keywords or topic identifier. The query is used to find information from one or more web services available to the web application and a plurality of results that apply to the query. In a module based web application, modules are selected in order to bring in appropriate content in response to the query. In cases where the relevant information is from multiple sources, it is extremely crucial to choose the appropriate source to provide the most relevant information. This might involve choosing modules from either the branded source or the un-branded source.

Most of the conventional web applications render greater importance to sponsored contents or contents of branded source that either provides greater immediate monetary returns or are reputable rather than on the actual content that are more relevant to a user's query or the long term returns that could be generated from a returning customer. Accordingly, the conventional web applications rank such content modules higher than the content modules that might be more relevant to the query. As a result, during the rendering of the content modules in the results page, the content modules ranked higher are rendered more prominently while the content modules that satisfy the user's intent but are ranked lower are not rendered at all. This results in a results page that is not optimal to the user's search needs or the long term monetization.

One way of avoiding branded contents is to choose only un-branded modules and generating a webpage using these modules in response to the query. However, by choosing only un-branded contents, one is not guaranteed that the returned content modules are optimal to the query and/or user.

Further, it is hard to select a relevant branded or un-branded source amongst a plurality of branded or un-branded sources that is more relevant to the user for the query. For instance, in case of financial information, it is hard to decide if the module from Wall Street Journal™ is more relevant than a module from CNN™ Finance. Similarly, it is hard to decide if any one un-branded source amongst a plurality of un-branded sources provides more relevant information for a breaking news story, such as Michael Jackson's death. Still further, expected relevant information for a query in one geo location may be different from another geo location. It would, therefore, not be practical to manually tag the topics without considering geo locations or just rely on only branded sources or un-branded sources for content. It is also likely that the branded content that would be most satisfying to one user would not be the most satisfying to another user.

It is in this context that embodiments of the invention arise.

SUMMARY

Embodiments of the present invention provide methods and computer implemented algorithm that enable selecting appropriate modules for generating a results page for search queries. The method includes identifying a plurality of content modules from both branded and un-branded sources whose content match a query. A query is transmitted to a web application on a server from a client. At the web application, the query is analyzed and a plurality of content modules are identified from anyone of a branded source or an un-branded source matching the query. One or more module performance indicators are computed for each of the content module associated with the topic and appropriate content modules are selected from the plurality of content modules based on the module performance indicators. The selected content modules are rendered on a topic page in response to the query. The selected content modules rendered on a topic page define relevancy of the content module to the query. The resulting web (topic) page provides an optimal result for the user and the query and ensures that the most relevant content modules, either branded or un-branded, are ranked and rendered most prominently while the content modules with least relevancy are rendered less prominently or totally eliminated from the topic page. The method further tracks user interactions at each of the content modules rendered on the topic page, updates the relevancy of the content modules by updating the one or more module performance indicators dynamically so that when the same query is subsequently received at the web application, the resulting web page will include content modules that reflect the updated relevancy of the module performance indicators.

It should be appreciated that the present invention can be implemented in numerous ways, such as methods, apparatus or a system. Several inventive embodiments of the present invention are described below.

In one embodiment, a method for optimizing content on a topic page is disclosed. The method includes receiving a query for a topic at a topic page on a client. The query is transmitted from the user agent on the client to a web application on a server. The web application includes algorithm to identify a plurality of content modules that match the query. An aggregate module performance indicators is computed as a product of weight associated with each module performance indicator and value associated with the related module performance indicator for each content module associated with the topic of the query. An aggregate module performance indicator for each of the plurality of content modules is generated by aggregating the corresponding one or more module performance indicators for each of the content modules. One or more content modules from the identified plurality of content modules are automatically selected for rendering on the topic page based on the aggregate module performance indicator associated with each of the identified content modules for the topic. The resulting topic page includes content modules from just the branded source, just the un-branded source or an aggregate of content modules from both branded source and un-branded source providing optimal content that is most relevant to the query.

In another embodiment, a computer-implemented optimizing algorithm for optimizing content of a topic page is disclosed. The optimizing algorithm includes programming logic to, a) receive a query for a topic at a web application on a server; b) identify a plurality of content modules from anyone of branded sources or an un-branded sources that match the query; c) compute one or more module performance indicators as a product of weight associated with each module performance indicator and value associated with the corresponding module performance indicator for each content module for the topic; d) aggregate the one or more module performance indicators associated with each content module to generate an aggregated module performance indicator for the respective content module; and e) select one or more of the content modules from the identified plurality of content modules for rendering on the topic page based on the aggregate module performance indicator of each content module. The resulting topic page provides optimal content for the query and includes content modules from just the branded sources, just the un-branded sources or an aggregate of branded and un-branded sources.

Thus, the embodiments of the invention provide an algorithm to optimize content on a topic page so that contents that meet a variety of goals including immediate monetization, long term monetization and user satisfaction are rendered in the topic page irrespective of the source. The content modules are selected and presented according to multiple factors including the users' views. Conventionally, the needs of a host of the web application were geared towards maximizing immediate revenue rather than seeking to optimize a variety of measures including user satisfaction and long-term monetization. By using module performance indicators and aggregate module performance indicators that are refined based on user interactions at the client, a more relevant topic page is provided that yields optimal revenue and user satisfaction.

Other aspects of the invention will become apparent from the following detailed description, taken in conjunction with the accompanying drawings, illustrating by way of example the principles of the invention.

BRIEF DESCRIPTION OF THE DRAWINGS

The invention may best be understood by reference to the following description taken in conjunction with the accompanying drawings.

DETAILED DESCRIPTION

Figure 1:
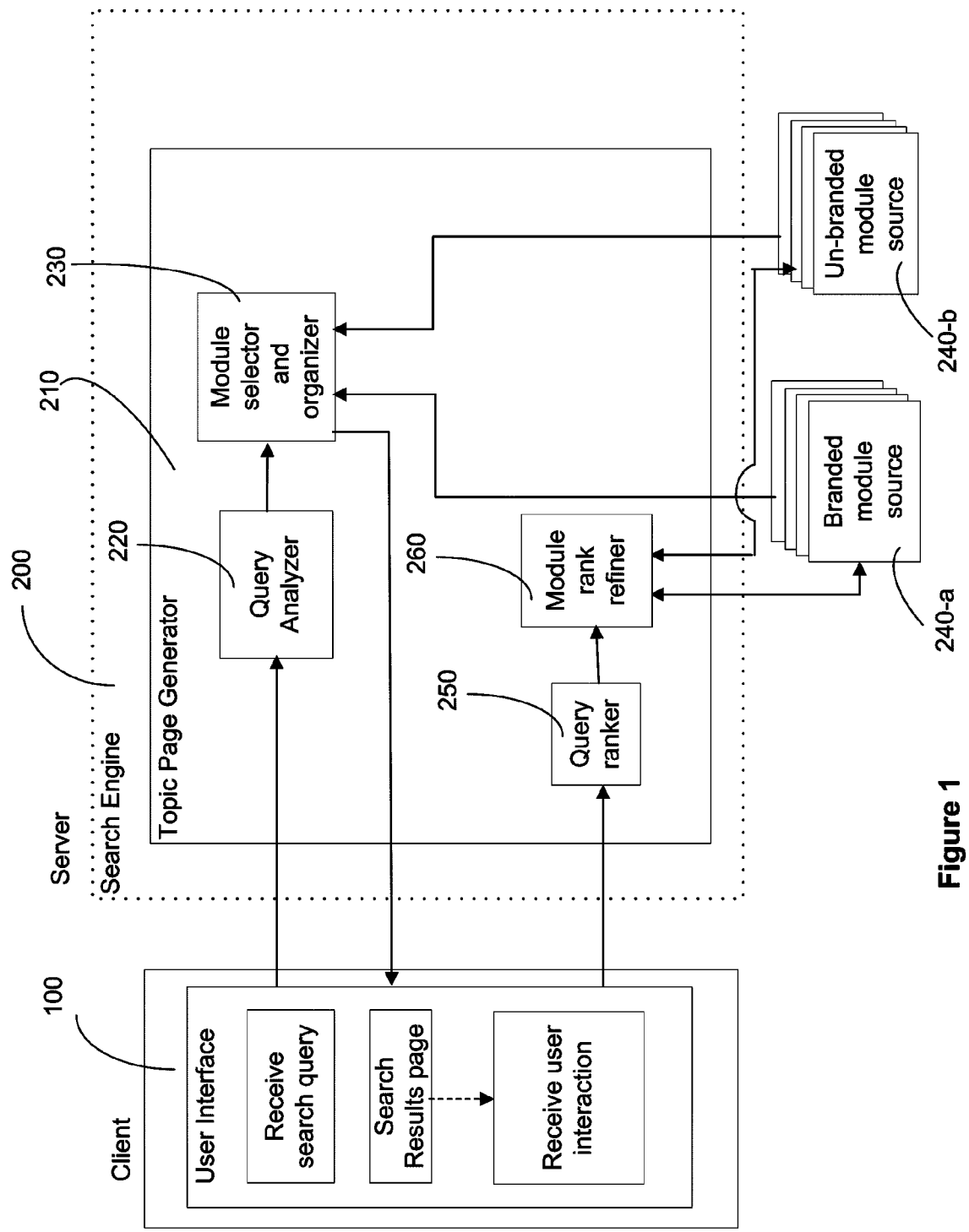
FIG. 1 illustrates a high-level block diagram of a system used in generating topic page for a plurality of dimensions, in accordance with one embodiment.

Broadly speaking, the embodiments of the present invention provide methods and computer implemented algorithms that enable optimizing contents on a topic page in response to a query. A query is received at the topic page from a user interface on a client. The query is forwarded to a web application on a server networked to the client. The received query is analyzed at a web application on the server and a set of content modules from one of branded sources, un-branded sources or an aggregate of branded and un-branded sources are selected based on the analysis. The content modules are presented on a topic page rendered on the client in response to the query. It should be noted that the embodiments discussed herein are exemplary and are not restricted to a search query. The embodiments can be extended to other realms, such as topics, etc.

The resulting topic page includes content modules that are relevant to the query, content-rich, and relies on a variety of factors including user satisfaction and long-term monetization rather than relying only on brand-weight. This results in a more balanced and relevant topic page than the ones provided by conventional web application.

The topic page is generated and populated with content modules by first identifying content modules from a branded source or an un-branded source, matching the query. For each of the content modules, one or more module performance indicators are computed and an aggregate module performance indicator is generated for each content module by aggregating the computed module performance indicators for the corresponding content modules. A set of one or more content modules are selected from within the plurality of identified content modules based on the aggregate module performance indicator of each content module and the selected set of content modules are rendered on a topic page. It is important to determine the appropriate content modules for a query so as to enhance content credibility and user engagement at the topic page. The resulting topic page includes content modules that are most relevant to the user's query and includes content from just the branded source, just the un-branded source or an aggregate of both the branded and un-branded sources. The selection of relevant content modules is performed by an algorithm running on a web application on the server. It should be understood that the algorithm can be in the form of a code running on a server. The algorithm code does not have to be integrally coupled to the web application logic but can be available to the web application logic.

The embodiments allow for fine-tuning the rendered topic page by tracking user interaction at each of the content modules in the topic page over time. The user interactions are used to dynamically compute weight of each module performance indicator associated with the query and to update the aggregate module performance indicator of each of the content modules based on the computed weight of each module performance indicator. The updated aggregate module performance indicator is used in fine-tuning the content modules during subsequent query.

FIG. 1 illustrates a high-level block diagram of various components of a computer system used in generating a topic page for a query, in one embodiment of the invention. It should be understood that this is only an exemplary system, and should not be considered limiting.

The system includes a client 100 with a user interface to receive and transmit a query. The client 100 is communicatively connected to a server 200 through a computer network (not shown), such as the Internet. The connection may be wired or wireless and may use any technology that allows the user interface at the client 100 to interact with the web application on the server 200. The user interface is also used to render a topic page on a with one or more content modules that is returned in response to the query and to capture user interactions at one or more of the content modules rendered on the topic page at the client 100.

The server 200 includes a web application to receive the query from the client 100, invoke one or more web services available to the web application to identify and select a plurality of content modules matching the query, generate a topic page with the selected content modules and return the topic page to the user interface at the client 100 for rendering. The resources may be from internal or external sources and may include contents from either a brand-named (branded) source, 240-a, or a generic (un-branded) source, 240-b. The content modules identified and returned by the web application includes factual and informational contents including one or more of textual content, audio content, video content, graphic images, or any other type of content that can be rendered on the topic page. In addition to various factual and informational contents, the content modules may include contents from sponsored advertisers wherein the contents are related to the query and the sponsored advertisement contents may, in turn, include audio, video, graphic or any other form of content that can be rendered on the webpage.

A topic page generator 210 available to the web application on the server 200 receives the query from the client 100 through the web application and interacts with one or more sources 240-a, 240-b, available to the web application to identify and retrieve one or more content modules and generate a topic page using the identified content modules that match the query. The topic page generator 210 may be a software code integrated within the web application logic or may be distinct from the web application logic and may be available to the web application for processing the query. The topic page generator 210, in turn, includes processing logic to process the query and identify the appropriate content modules. The processing logic is in the form of a plurality of modules, such as a query analyzer module 220, a module selector and organizer 230, a query ranker module 250 and a module rank refiner 260, with each of the modules performing a specific function. The query analyzer module 220 receives the query and analyzes the query to identify a plurality of content modules. The query analyzer module 220 interacts with the module selector and organizer 230 to identify the content module. In addition to interacting with the module selector and organizer 230, the query analyzer module 220 analyzes the query to identify one or more parameters associated with the query and computes one or more module performance indicators for each content module identified for the query based on the parameters. The module performance indicators are computed by assigning an appropriate weight and identifying a value for the module performance indicator based on the query and its associated parameters. Some of the parameters identified by the query analyzer module 220 include a topic, intent, a geo location of a user originating the query, date of the query, query frequency, query popularity, query freshness requirement, associated with the query. Some of the different module performance indicators that are relevant to the current embodiments and computed by the query analyzer module 220 are specified herein. Each of the aforementioned module performance indicators is weighted against the other module performance indicators and is accorded a specific weight based on the comparison.

1) Look at search engine logs and look for searches for the current topic. It should be noted that although the current embodiments are not necessarily integrated directly with a search engine, an algorithm associated with the topic page generator makes use of information derived from search engines. For each of the web pages clicked on by a user, compute a term frequency-inverse document frequency (TFIDF) score. The TFIDF is a weight often used in information retrieval and text mining and is defined as a statistical measure used to evaluate how important a word is to a document in a collection. The importance of the word increases proportionally to the number of times the word appears in a document but is offset by the frequency of the word in the collection. Given a query or topic, term frequency (TF) is determined for each of the terms in the query/topic. In one embodiment, term frequency is defined as the number of times each of the term appears in a document. An inverse document frequency (IDF) factor is incorporated which diminishes the weight of terms that occur very frequently in the collection and increases the weight of terms that occur rarely. With the TF value and IDF value, a combined TFIDF score is determined Using the TFIDF score, the likelihood of a particular brand's page(s) would be clicked on is determined. Then, for each brand's site(s), the deviation from the expected click rate is computed. This is one module performance indicator.

2) Same as module performance indicator 1 above, but only looking at the history of a current user.
3) Same as module performance indicator 1 above, but only looking at the search history for users with similar demographics.
4) Same as module performance indicator 1 above, but only looking at users in the current user's social network.
5) Same as module performance indicators 1-4 above, but instead of using TFIDF scores, using PageRank scores or similar mechanism for computing expected click rates.
6) Same as module performance indicators 2-4 above, but using the actual click rates for all users who searched for the topic to compute the expected click rate. Only look at the current user, users with similar demographics, or members of the current user's social network.
7) All of the module performance indicators 1-6 above, but looking for previous behavior in topic pages captured by topic page generator instead of looking at search engine logs. Look at relative frequencies of use of the branded sites that the user, the user's friends/acquaintance or that users' with similar demographics to the target user visited over time.
8) Look at size of content returned by the module for a query (or topic) including number of articles, size of each article, etc.
9) Look at content quality.
10) Look at how focused the module content is around the query (or topic). For example, is the resulting page about the topic or the topic text is just mentioned in the page.
11) Evaluate the trustworthiness of the module or module source, which may be a combination of a score assigned by a human editor and performance indicator of the module for all queries.
12) Look at content freshness—how frequently the contents are updated and how soon the content changes.

Each of the aforementioned module performance indicators is weighted against the other module performance indicators and is accorded a specific relative weight based on the comparison.

The query analyzer module 220 determines the TFIDF score based on historical logs or by other means associated with the query. The historical logs track user interactions of a plurality of users including the user that generated the query at each of the content modules rendered at the user interface of the client. In addition to tracking user interactions at each content module, user actions on the Internet are also tracked. User actions over a period of time define the user's behavior and interest. Thus, the historical logs track not only a plurality of users' action at each of the content modules rendered in response to the query but also tracks each user's actions over a period of time so as to understand each user's preferred brand, interest and behavior so that the selection of content modules can be customized to the user for a particular query or class of queries, such as sports queries. The historical logs, in one embodiment, may also track these details based on geo location of the query so as to enable identification of appropriate content modules relevant to the query for a particular user at a particular geo location. The historical logs may be maintained internally either on the server 200 and accessible to the query analyzer module 220 or may be maintained externally and accessible to the query analyzer module 220 or, alternately, the query logs could be preprocessed and the results of the preprocessing made accessible to the query analyzer module.

Weighting the one or more module performance indicators may depend on various factors, such as popularity of the query, requested content type, demographics of the users, etc. For instance, in one embodiment, the query analyzer module 220 may weigh the topic and intent higher than the other parameters. In another embodiment, the topic, geo location of the query, query intent and popularity (based on historical data) are weighed higher than the other parameters.

In one embodiment, the intent of the query may vary based on the geo location of the query. Some of the intents for a topic, such as general information, breaking news, shopping, local happenings, specials, etc., may be specific for specific geo location. By identifying the relevant intents of the query for a topic at a geo location, appropriate content modules may be identified so that the contents from the search are more relevant to the query. As can be seen, various different factors are taken into consideration during weighing of each of the module performance indicators and using the module performance indicators in the identification and selection of the content modules.

After identifying and weighing the one or more module performance indicators by the query analyzer module 220, the module selector and organizer (organizer) 230 uses the module performance indicators and their relevant weights to identify and select one or more content modules from a plurality of sources 240 that are available to the topic page generator 210 for rendering on the results webpage. The module organizer 230 interacts with a historical log repository (not shown) in order to understand the activities performed on the Internet by the user that generated the query and interacts with a plurality of module sources to select the appropriate content modules. Accordingly, the module organizer 230 accesses the specific web services, such as branded module web service 240-a or un-branded module web service 240-b, to obtain the content modules based on the module performance indicators. The specific source repositories may include sources that are on the server or sources that are external to the server 200 but accessible by the module organizer 230. Metadata associated with each of the content modules may be used in identifying and selecting the content modules that match the one or more module performance indicators of the query.

Next, the identified content modules are ranked by the module organizer 230. In one embodiment, the module organizer 230 computes an aggregate module performance indicator for each of the identified content modules by aggregating the module performance indicators for each of the content modules using an algorithm wherein each module performance indicator is expressed as a product of weight of each module performance indicator and value associated with the module performance indicator based on the identified content modules. In one embodiment, the algorithm may be expressed as a simple and basic polynomial expression with a plurality of variables having suitable coefficients, such as:

$Fn(A)=W_a*A+W_b*B+W_c*C+W_d*D+\ldots$ where $W_a$ is the weight of module performance indicator "a", $W_b$ is the weight of module performance indicator "b", $W_c$ is the weight of module performance indicator "c", etc., and A is the value associated with module performance indicator "a", B is the value associated with module performance indicator "b", C is the value associated with module performance indicator "c", etc. The weight of a module performance indicator "a" is based on the weight accorded to it against weights accorded to other module performance indicators associated with the content module. Thus, for instance a module performance indicator, such as number of searches for a topic by a current user may be accorded a higher weight than number of searches for a topic by users of similar demographics as the current user, which might be accorded a lower weight. Each module performance indicator is accorded a weight between the value of 0 and 1. Similarly, the value accorded to each module performance indicator is a function of a plurality of query-related options. In one embodiment, the value of each module performance indicator is defined as a function of topic of the query, type of the content module and brand of the content module. Thus, value of module performance indicator 'a'=fn $(Topic_a, Type_{cm}, Brand_{cm})$ where 'a' is the module performance indicator and 'cm' is the content module. Using these two functions for weight and value for each module performance indicator, the organizer module 230 computes the aggregate module performance indicator for each of the content modules. The organizer module 230 then compares the aggregate module performance indicator associated with each content module against a threshold value, in one embodiment. If the aggregate module performance indicator for a branded content module is above the threshold value, then the branded content module is selected for rendering on the topic page. The content modules are ranked and prioritized on the topic page based on the relative amount over which the aggregate module performance indicator of each content module is over the threshold value. For instance, when a content module from a branded source and a content module from an un-branded source match the parameters of the query, the aggregate module performance indicator of the branded content module and the un-branded content module are compared against each other. Based on the comparison, one of the branded content module or the un-branded content module is selected, in one embodiment. The resulting topic page reflects the order of relevance accorded to each content module on the topic page. Based on the ranking, the content module with the highest module performance indicator ranking is selected for rendering on the topic page.

The organized topic page is forwarded to the client for rendering on a topic page at the user interface. Upon rendering the topic page on the topic page, user interactions at the various content modules are tracked. These user interactions provide information on the relevancy of the content module to the query. For instance, a content module that is clicked on may be more relevant to the user for the query than the one that was not clicked on and the content module that was clicked on as soon as the topic page was rendered or clicked on more frequently may be more relevant than the one that was clicked on after a considerable period of time. Such user interactions are gathered at the client 100 over a period of time and transmitted to the server 200. The server receives the user interactions at each of the content modules and updates the appropriate historical logs, such as logs maintained by a topic page generator, available to the server. As mentioned earlier, the historical logs also keep track of each user's Internet activity in addition to the interaction at each of the content module. A query ranker 250 at the topic page generator 210 receives the user interaction data of one or more content modules and of the user and dynamically updates the weight of one or more module performance indicators based on the user interaction data.

The query ranker 250 updates the weight of the one or more module performance indicators by first analyzing the user interaction data to determine the related content modules that the user interaction data belongs to and to identify the one or more module performance indicators corresponding to those content modules. The query ranker 250 then updates the weight of the identified one or more module performance indicators based on the user interaction data. The user interaction data defines the user views on the topic page at the user interface of the client 100. The updated weights of the one or more module performance indicators reflect the relevancy of each of the module performance indicators in the query.

Once the weights of the one or more module performance indicators associated with the query are updated, the content module rankings are dynamically refined using a module rank refiner 260. The refiner 260 uses the user interaction data and the updated weights of the module performance indicators to refine the way one or more content modules for the query are ordered and placed on the topic page so that subsequent queries will reflect the content modules according to the relevancy dictated by the updated module performance indicators. The module rank refiner 260 interacts with the one or more content module sources to update the ranking data of the relevant content modules for the query. The refining of the content module ranking continues so long as the user requests content modules through the query.

Thus, the content modules are identified and selected based on module performance indicators, ranked and placed on the topic page based on the weights of the module performance indicators, and refined based on the updated weights of the module performance indicators. The selection and placement of the content modules reflect the users' views resulting in more relevant results for the query rather than reflecting on the source or any other parameters, such as potential advertisement revenues, which may not provide the most relevant results for the query. The topic page may include content modules from just the brand-name source, just the generic source or may include a combination of content modules from both the brand-name source and generic source. Additionally, based on the weight of the module performance indicators, the ranking of the content modules associated with brand-name source, un-branded source vary with sometimes the content modules from the un-branded source being at the top and sometimes the content modules from the branded source being at the top of the topic page. The content modules may include any one or combination of textual content, audio content, video content, image content, gif content or any other type of content that can be rendered on the user interface of the client 100. The algorithm enables thousands or even millions of topics each to be automatically evaluated to determine whether for that specific target, current user and context a branded or unbranded module is appropriate. This is not feasible with the traditional system of having an editor decide whether or not to use branded content. No reasonable number of editors could independently evaluate this many topics and combinations of topics and users/contexts. Additionally, the algorithm is sensitive enough to enable greater granularity in evaluating even the most restrictive of topics.

Figure 2:
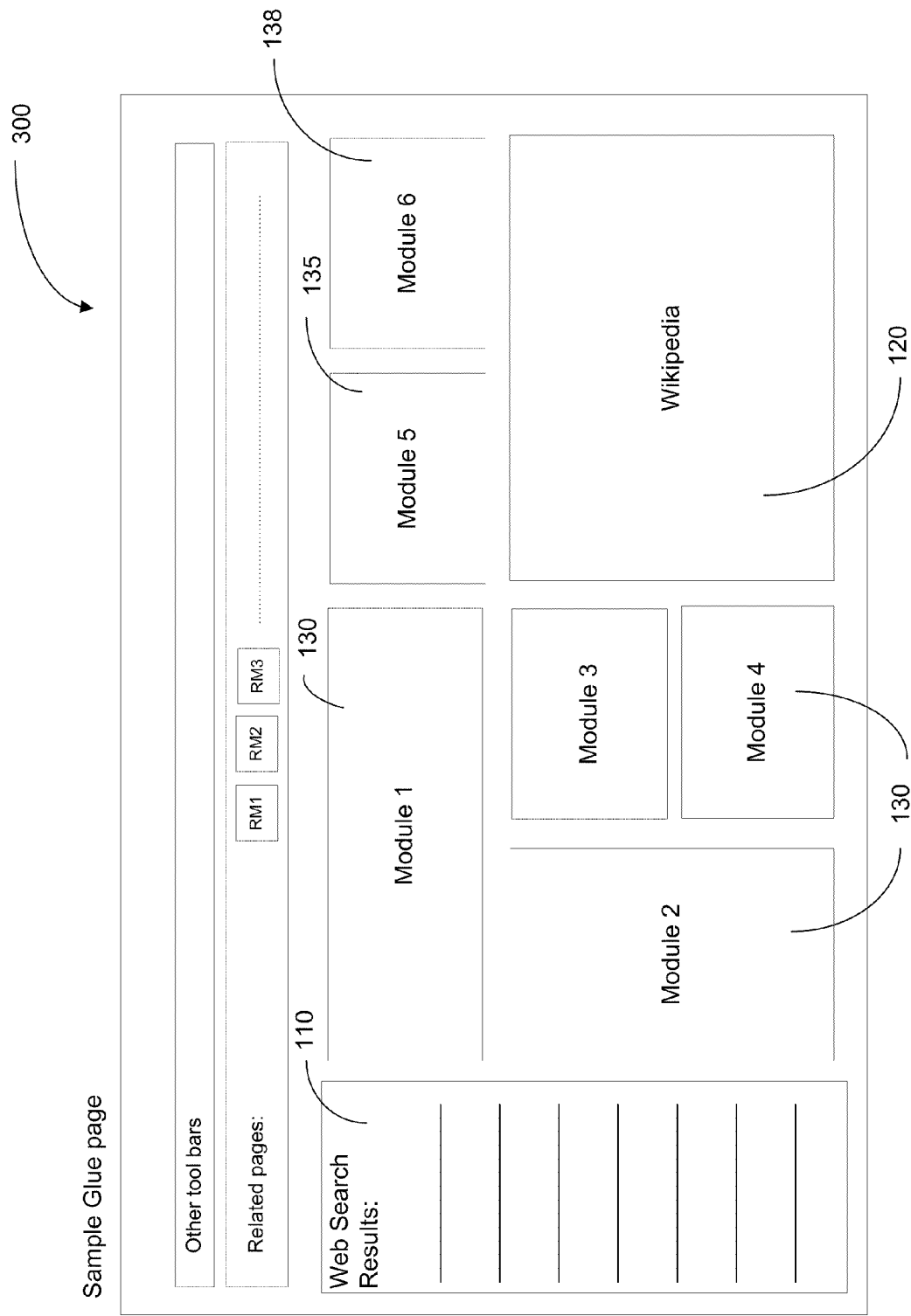
FIG. 2 illustrates a sample block view of a topic page with a plurality of content modules and links to related pages, in accordance with one embodiment.

FIG. 2 illustrates a block diagram of a typical topic page 300 rendered at a topic page of the client 100. The topic page includes a plurality of result links 110, a brand name content module, 120, such as a Wikipedia™ page associated with the query, one or more textual content modules 130, one or more of image content modules 135 and one or more of video content modules 138. The topic page 300 of FIG. 2 is an exemplary embodiment and should not be considered limiting. In another embodiment, the topic page may include content modules from just generic sources. In yet another embodiment, the topic page may include content modules from just brand-name sources. In this embodiment, the content modules may be from a plurality of brand-name sources with the rank and placement of the content modules from different brand-name sources dictated by the weight of the one or more module performance indicator associated with each of the content modules.

Figure 2A:
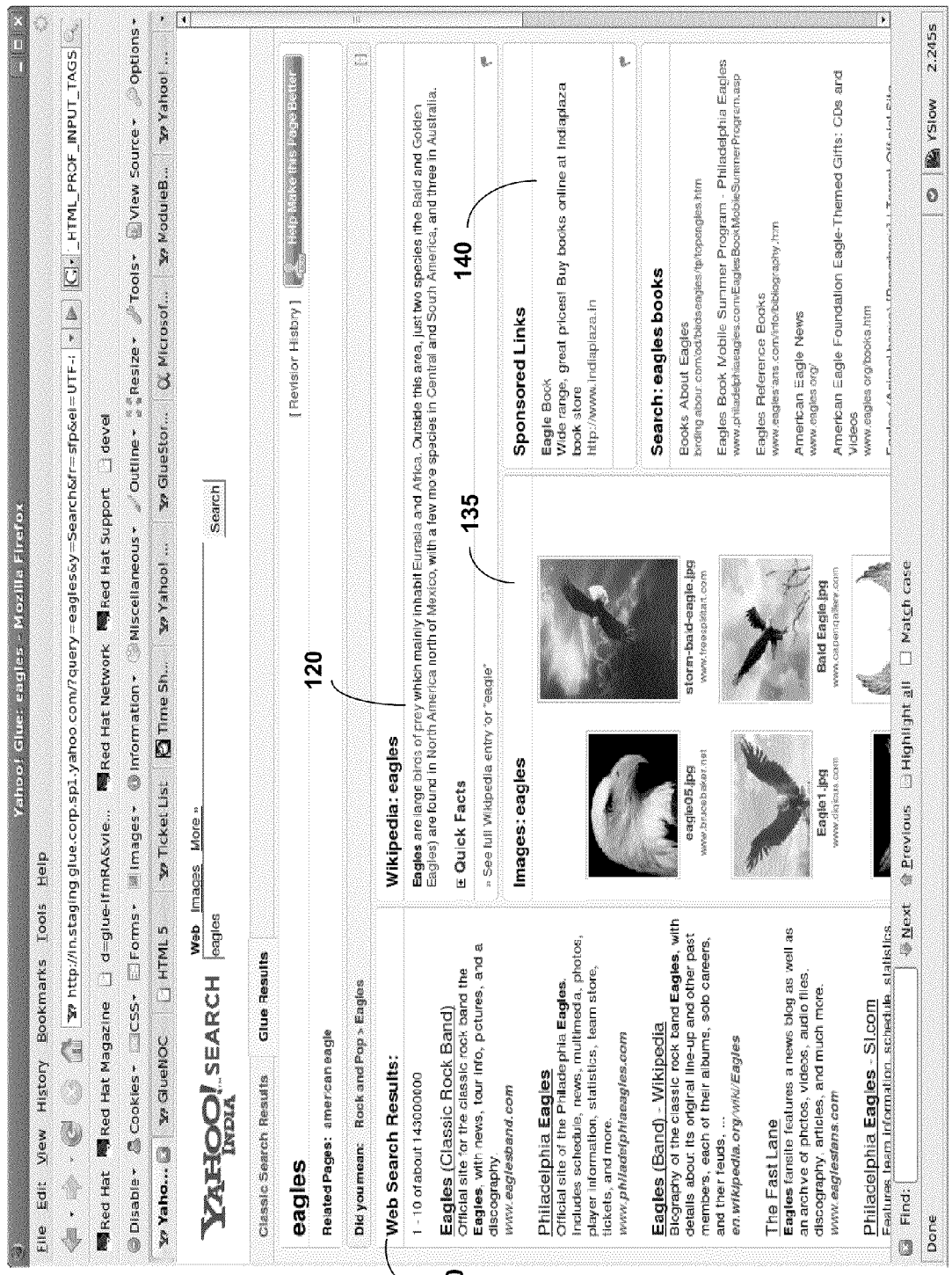
FIGS. 2A and 2B illustrate sample topic pages with relevant content modules associated with a topic for different geo locations, in one embodiment of the invention.
Figure 2B:
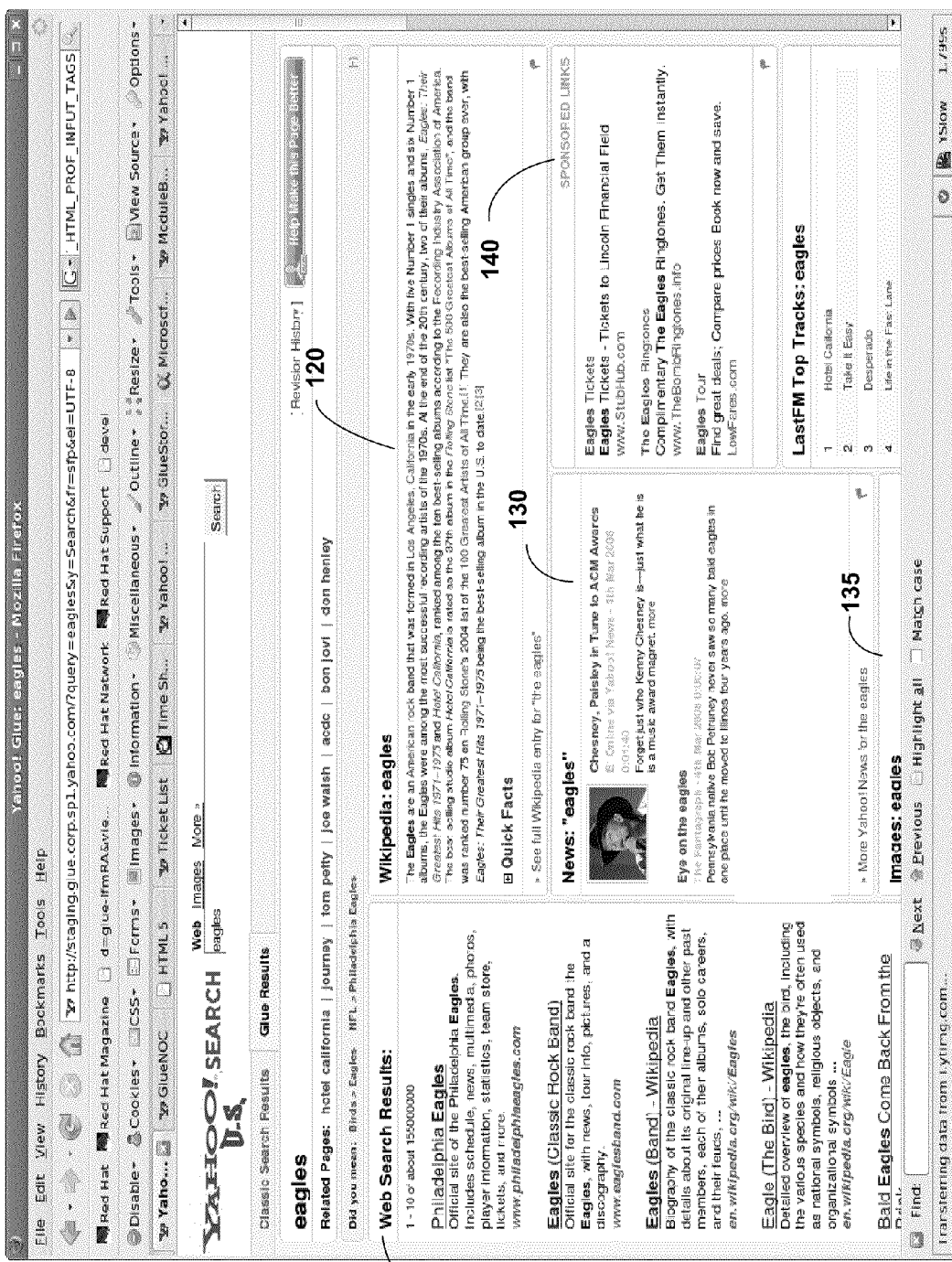

In one embodiment, the content modules may be identified and rendered based on geo location of the query. FIGS. 2A and 2B illustrate two such sample topic page. FIG. 2A illustrates the topic page for geo location of India and FIG. 2B illustrates the topic page for geo location U.S.A. As can be seen from FIGS. 2A and 2B, the content modules for the topic page for the same query differ based on the geo location. In addition to geo location, the content modules may be selected based on other parameters, such as demographics, query time, etc.

The selected content modules are organized on the topic page using one or more attributes of the topic page, such as preferred location, location where the content should not be placed, etc., and the one or more attributes of the selected content modules, such as display size, content type, author, source, weight, etc. The rendered content modules preserve the relative weight and ranking.

In addition to the content modules that match the query, additional content modules may be identified and rendered on the topic page. In one embodiment, a set of sponsored results, as illustrated by the sponsored links 140 in FIGS. 2A and 2B, are identified and rendered on the topic page alongside the plurality of content modules. The sponsored results, such as advertisements, that are included in the topic page are tailored for the identified query. In one embodiment, in addition to the query, the sponsored results may be tailored to one or more module performance indicators, such as geo location or demographics related to the query.

Figure 3:
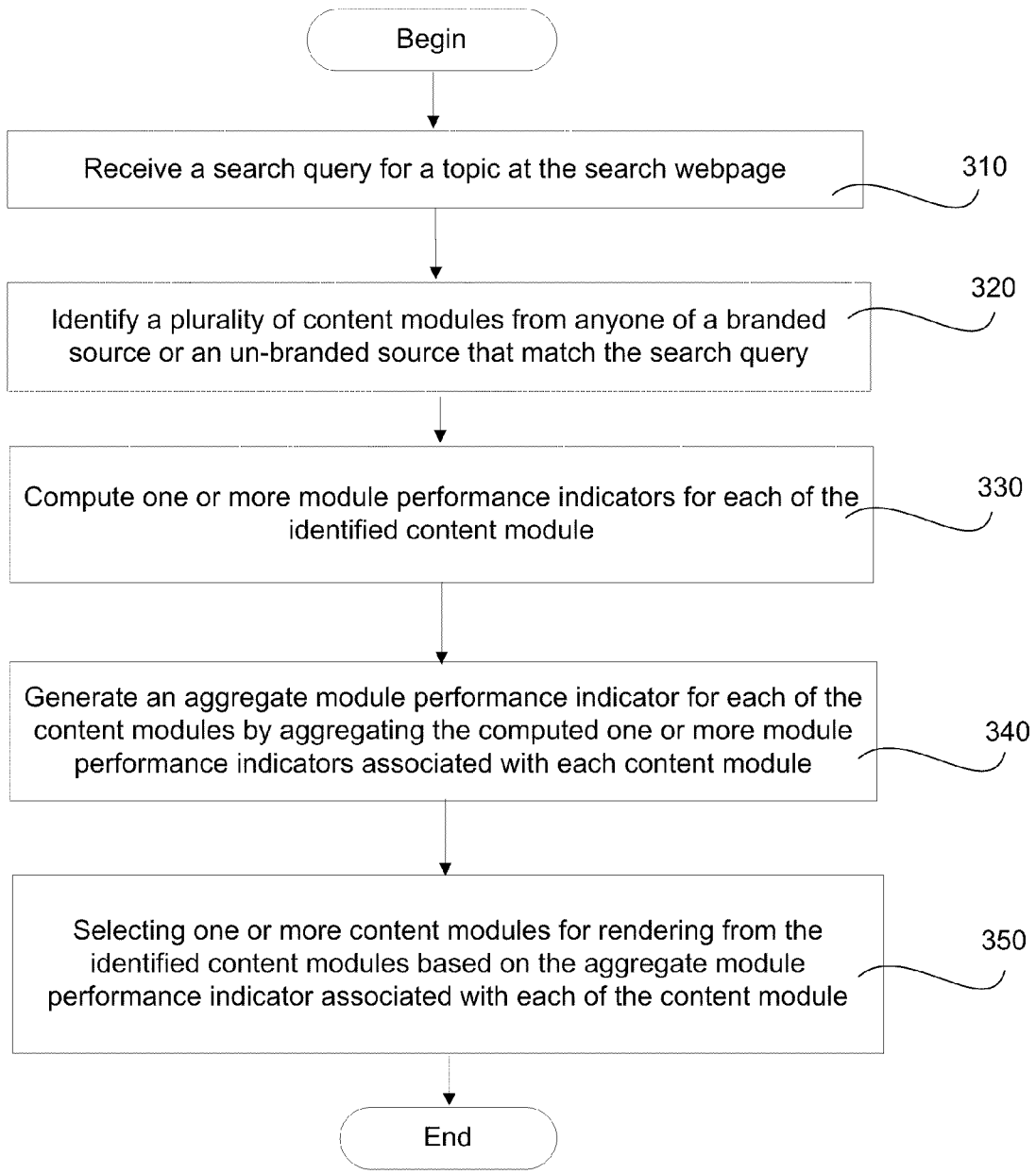
FIG. 3 illustrates a flow chart of process operations involved in optimizing content on a topic page for a query, in accordance with one embodiment of the invention.

With the above general understanding of the various embodiments, a method for optimizing content on a topic page for a query on a topic page will now be described in detail. FIG. 3 illustrates the various method operations associated with optimizing of the topic page. The method begins when a query for a topic is received at a topic page, as illustrated in operation 310. The query is received through a user interface and is transmitted to a web application on the server for further processing. A web application on the server receives the query and forwards the same to a topic page generator. A query analyzer module within the topic page generator analyzes the query and identifies a plurality of content modules from various sources that match the query, as illustrated in operation 320. The content modules are selected from anyone of branded sources or un-branded sources. One or more module performance indicators are computed for each of the identified content modules, as illustrated in operation 330. A module performance indicator for a content module is computed as a product of the weight of each module performance indicator against the other module performance indicators for the content module and the relevant value of each module performance indicator associated with the content module for the query. An aggregate module performance indicator is generated for each of the plurality of identified content modules using the computed module performance indicators associated with each of the identified content modules, as illustrated in operation 340, using the algorithm described earlier. Upon computing the relative weight of each module performance indicator listed above, the aggregate module performance indicator for each content module is generated as a sum of the relative weights of the module performance indicators associated with each content module. Based on the aggregate module performance indicator for each content module, a set of one or more content modules are selected from the identified content modules for rendering on a topic page, as illustrated in operation 350. The selected set of content modules is organized in the topic page in the order of the aggregate module performance indicator of each content module. The process concludes with the topic page rendered at the client in response to the query.

The rendered topic page provides content modules that are most relevant to the query, content-rich, and are geared towards users' views and not biased over brand-name source.

Figure 4:
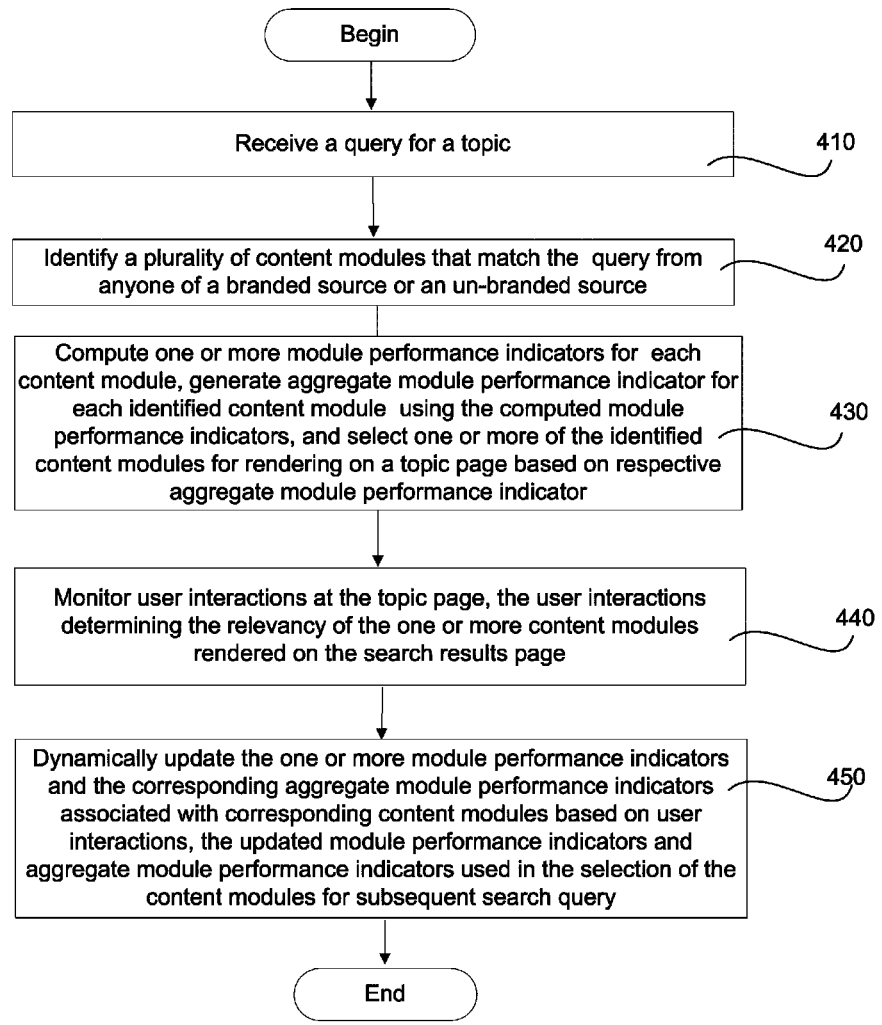
FIG. 4 illustrates a flow chart of process operations involved in generating a topic page for a query, in accordance with an alternate embodiment of the invention.

FIG. 4 illustrates the various process operations used in generating a topic page for a query, in an alternate embodiment of the invention. The process begins at operation 410 wherein a query request for content modules is received and analyzed at a web application on a server. The query request is obtained through a user interface and forwarded to the server. A web application on the server receives the query, analyzes the query and identifies a plurality of content modules that match the query, as illustrated in operation 420. In addition to the content modules, a plurality of results, links to related pages and sponsored advertisements may also be identified for the query.

One or more module performance indicators associated with each of the identified content modules is computed. The module performance indicator may be defined as a product of weight of the module performance indicator and a value associated with the module performance indicator. The value of the module performance indicator, in turn, is defined as a function of topic of the query, type of the content module and brand of the content module. One or more content modules from the identified content modules are selected based on an aggregate module performance indicator associated with each content module, as illustrated in operation 430. The aggregate module performance indicator for each content module is obtained by aggregating the computed module performance indicator associated with the content module. The selected content modules are organized on a topic page and returned to the client for rendering in response to the query. The organization of the selected content modules is based on the aggregate module performance indicator of each of the content module. The organization of the content modules in the topic page defines the relative relevance of the content module to the query. Upon rendering the topic page on the client, user interactions are monitored at each of the content modules, as illustrated in operation 440. In one embodiment, the user interactions at each of the content modules are obtained through historical logs that identify the user interactions at a content module over time. In addition to the user interactions at the content modules, the historical logs also provide information about user interactions on the Internet, in general. Tracking general user interactions of a user on the Internet helps in identifying the affinity of a user to a particular topic, specific type of content modules for the particular topic, etc., so that the weight of the module performance indicators can be updated for the user and appropriate content modules selected based on this relevancy. Additionally, the module performance indicators are weighed based on user interactions of a plurality of users over time using historical logs and the weight of each of the module performance indicators is evaluated. Thus, the weight of each module performance indicator may indicate not only a single user's affinity but a plurality of user's affinity so that the most relevant content modules can be identified and selected for rendering at the topic page.

The process concludes at operation 450, wherein the one or more module performance indicators and the corresponding aggregate module performance indicator for the content modules identified by the user interactions are dynamically updated based on the user interactions. Relative weights of the module performance indicators associated with the content modules are dynamically updated based on the user interactions at the respective content modules. and the aggregate module performance indicator for each of the content modules is generated dynamically to reflect the updated weights of the relevant module performance indicators. These updated module performance indicators and aggregate module performance indicators of the content modules are stored in the respective content module repositories along with the content modules and are used in subsequent query. The resulting topic page for subsequent queries are content-rich, query specific and are based on users views and are not brand-biased or revenue-biased.

Some of the module performance indicators that may be identified and used in identifying, selecting, placing and refining the content modules include: (a) popularity of the topic of the query by identifying number of searches in search engine logs for the topic, (b) popularity of the topic for the current user by identifying searches from the search engine logs for the topic for the current user, (c) popularity of the topic for users with similar demographics as the current user by identifying number of searches from the search engine logs of users with similar demographics as the current user, (d) popularity of the topic for users in the current user's social network by identifying number of searches from the search engine logs for the topic by current user's social network of users. The indicators in options (a) through (d) are obtained using TFIDF scores explained earlier. The user interactions at each of the content modules could be obtained by monitoring click rates, in one embodiment. Additional indicators used in identifying the modules for the topic page include options (a)-(d) above using PageRank score or similar mechanism instead of TFIDF scores for computing expected click rates or options (b)-(d) above using actual click rates for all users who search for the topic to compute the expected click rates by looking at only the current user, users with similar demographics or members of the current user's social network, or by looking at previous behavior in topic pages of the current user, users in the same demographics as the current user or members in the current user's social network, and the relative frequencies of the branded sites that the current user, the users friends or users with similar demographics visited over time. It should be noted that each content module may include links to related pages. Each of the related pages may provide a further link to another page with plurality of content modules or to a related website. So, by tracking the user interaction at each of the related pages or at the plurality of content modules, a user can be presented with an optimal topic page that is most relevant to the user, ultimately providing maximum monetization and user satisfaction.

Although the current embodiments have been described with respect to search queries, the processing of search queries should be considered exemplary and not limiting. Other types of queries may be processed using the teaching of the present invention.

Although the various embodiments of the invention have been defined with respect to topic page generator, the embodiments of the invention can be extended to serve other areas where content modules are rendered.

Thus, embodiments of the invention provide a tool to generate customized topic page that is rich in content and relevant to the query. The topic page is optimized for a user and may take into account geo location, intent, and other module performance indicators by analyzing the query to identify the module performance indicators and including content modules for topic(s) that are most relevant to the user.

It will be obvious, however, to one skilled in the art, that the present invention may be practiced without some or all of these specific details. In other instances, well known process operations have not been described in detail in order not to unnecessarily obscure the present invention.

Embodiments of the present invention may be practiced with various computer system configurations including handheld devices, microprocessor systems, microprocessor-based or programmable consumer electronics, minicomputers, mainframe computers and the like. The invention can also be practiced in distributed computing environments where tasks are performed by remote processing devices that are linked through a wire-based or wireless network.

With the above embodiments in mind, it should be understood that the invention could employ various computer-implemented operations involving data stored in computer systems. These operations are those requiring physical manipulation of physical quantities. Usually, though not necessarily, these quantities take the form of electrical or magnetic signals capable of being stored, transferred, combined, compared and otherwise manipulated.

Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can thereafter be read by a computer system. The computer readable medium can also be distributed over a network-coupled computer system so that the computer readable code is stored and executed in a distributed fashion.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for optimizing content on a topic page, comprising:
    receiving a query for a topic;
    identifying a plurality of content modules from anyone of a branded source or an un-branded source that match one or more parameters of the query;
    computing one or more module performance indicators for each of the identified plurality of content modules for the topic based on the one or more parameters, each module performance indicator defined as a product of weight and value associated with the respective module performance indicator;
    generating an aggregate module performance indicator for each of the plurality of content modules; and
    selecting one or more of the content modules for rendering on the topic page based on the aggregate module performance indicators associated with each content module for the topic,
    wherein the topic page includes content from just the branded source, just the un-branded source or an aggregate of both the branded source and un-branded source,
    wherein selecting the one or more content modules further includes,
        comparing the aggregate module performance indicator of each of the plurality of content modules against a threshold value;
        selecting the content module associated with the branded source for rendering if the aggregate module performance indicator corresponding to the content module of the branded source is over the threshold value; and
        selecting the content module associated with the un-branded source for rendering if the aggregate module performance indicator associated with the content module of the un-branded source is over the threshold value.

2. The method of claim 1, wherein generating an aggregate module performance indicator further includes,
    aggregating the one or more of the computed module performance indicators related to the parameters of the query for each of the plurality of content modules to generate the aggregate module performance indicator for each of the plurality of content modules, the aggregate module performance indicator for each of the plurality of content modules used in selecting the one or more content modules for rendering.

3. The method of claim 1, further includes,
    when more than one content module from different sources has the same aggregate module performance indicator,
    ranking the content modules based on the weight of each module performance indicator associated with each of the content modules; and
    selecting the content module with a highest rank for rendering on the topic page, wherein the content module with the highest rank may be from the branded source or the un-branded source.

4. The method of claim 1, wherein the module performance indicator includes geo location information associated with the query, the geo location information driving the identification and presentation of appropriate content modules in the topic page.

5. The method of claim 1, wherein the selecting the one or more content modules further includes,
    tracking user actions at the one or more content modules of the topic page over a period of time, the user actions capturing user behavior and interest for the one or more content modules;
    identifying the one or more content modules based on the corresponding user actions and module performance indicators; and presenting the identified content modules in response to the query.

6. A method for optimizing content on a topic page, comprising:
- receiving a query for a topic;
- identifying a plurality of content modules from anyone of a branded source or an un-branded source that match one or more parameters of the query;
- computing one or more module performance indicators for each of the identified plurality of content modules for the topic based on the one or more parameters, the module performance indicator defined as a product of weight of each module performance indicator and value associated with the module performance indicator of each of the identified plurality of content modules;
- generating an aggregate module performance indicator for each of the plurality of content modules;
- selecting one or more of the content modules from the identified plurality of content modules from anyone of the branded or un-branded sources for rendering on the topic page based on the aggregate module performance indicators associated with each content module for the topic so as to provide optimal content for the query, wherein the topic page includes content modules from just the branded source, just the un-branded source or an aggregate of both the branded source and un-branded source;
- presenting the topic page with the plurality of content modules in response to the query;
- gathering user interactions at each of the content modules over time, the user interactions defining relevancy of each of the content modules to the query;
- dynamically updating the weight of one or more module performance indicator of the respective content modules over time based on the user interactions; and
- dynamically computing the module performance indicators and updating the corresponding aggregate module performance indicators of the respective content modules to reflect the corresponding updated weight of the one or more module performance indicators, the updated aggregate module performance indicator used in the selection and arrangement of the appropriate content modules in the topic page during subsequent query.

7. A method for optimizing content on a topic page, comprising:
- receiving a query for a topic;
- identifying a plurality of content modules from anyone of a branded source or an un-branded source that match one or more parameters of the query;
- computing one or more module performance indicators for each of the identified plurality of content modules for the topic based on the one or more parameters, the module performance indicator defined as a product of weight of each module performance indicator and value associated with the module performance indicator of each of the identified plurality of content modules;
- generating an aggregate module performance indicator for each of the plurality of content modules;
- selecting one or more of the content modules from the identified plurality of content modules from anyone of the branded or un-branded sources for rendering on the topic page based on the aggregate module performance indicators associated with each content module for the topic so as to provide optimal content for the query, wherein the topic page includes content modules from just the branded source, just the un-branded source or an aggregate of both the branded source and un branded source,
- wherein a module performance indicator for each of the one or more content modules is computed by measuring deviation of actual user interaction at the respective content module against an expected user interaction for the content module, wherein the expected user interaction is available at a source of the content module and actual user interaction is obtained from a historical log maintained for the content module.

8. The method of claim 7, wherein measuring deviation of actual user interaction at the content module is by measuring deviation of user interaction of a current user.

9. The method of claim 7, wherein measuring deviation of actual user interaction at the content module is by measuring deviation of user interaction of a plurality of users sharing similar demographics as that of a current user.

10. The method of claim 7, wherein measuring deviation of actual user interaction at the content module is by measuring deviation of user interaction of a plurality of users in a current user's social network.

11. The method of claim 7, wherein measuring deviation of actual user interaction is by measuring click rates of a current user at the content module and comparing against expected click rate for the content module from the source of the content module.

12. The method of claim 7, wherein measuring deviation of actual user interaction is by measuring click rates at the content module of a plurality of users with similar demographics as a current user and comparing against expected click rate for the content module from the source of the content module.

13. The method of claim 7, wherein measuring deviation of actual user interaction is by measuring click rates at the content module of a plurality of users in a current user's social network and comparing against expected click rate for the content module from the source of the content module.

14. The method of claim 7, wherein measuring deviation of actual user interaction is by measuring previous behavior at the topic page of one or a combination of a current user, a plurality of users with similar demographics as the current user, a plurality of users in the current user's social network and comparing against expected behavior at the topic page.

* * * * *